United States Patent [19]

Gyugyi et al.

[11] Patent Number: 5,808,452
[45] Date of Patent: Sep. 15, 1998

[54] POWER FLOW CONTROLLER WITH DC-TO-DC CONVERTER LINKING SHUNT AND SERIES CONNECTED INVERTERS

[76] Inventors: Laszlo Gyugyi, 333 Stoneledge Dr., Pittsburgh, Pa. 15235; Colin David Schauder, 3615 Forbes Trail Dr., Murrysville, Pa. 15668; Scott Lawrence Williams, 152 William Feather Dr., Voorhees, N.J. 08043

[21] Appl. No.: 929,685

[22] Filed: Sep. 15, 1997

[51] Int. Cl.⁶ .................................................. G05F 1/70
[52] U.S. Cl. .......................................................... 323/207
[58] Field of Search .................................. 323/205, 207, 323/215; 363/34, 35, 37, 39, 40

[56] References Cited

U.S. PATENT DOCUMENTS

| | | | |
|---|---|---|---|
| 4,638,416 | 1/1987 | Neupauer et al. | 363/35 |
| 5,343,139 | 8/1994 | Gyugyi et al. | 323/207 |
| 5,469,044 | 11/1995 | Gyugyi et al. | 323/207 |
| 5,698,969 | 12/1997 | Gyugyi | 323/207 |

*Primary Examiner*—Matthew V. Nguyen

[57] ABSTRACT

A unified power flow controller has a dc-to-dc converter which uses the dc voltage produced by a first static inverter, connected in shunt with a transmission line and providing parallel reactive compensation, to establish the magnitude of a series compensation voltage injected into the transmission line by a second static inverter. The second static inverter then only has to regulate the phase angle of the series injected voltage. With the dc-to-dc converter turned off, the two inverters are decoupled and can be operated independently even if the other inverter is not operational.

6 Claims, 3 Drawing Sheets

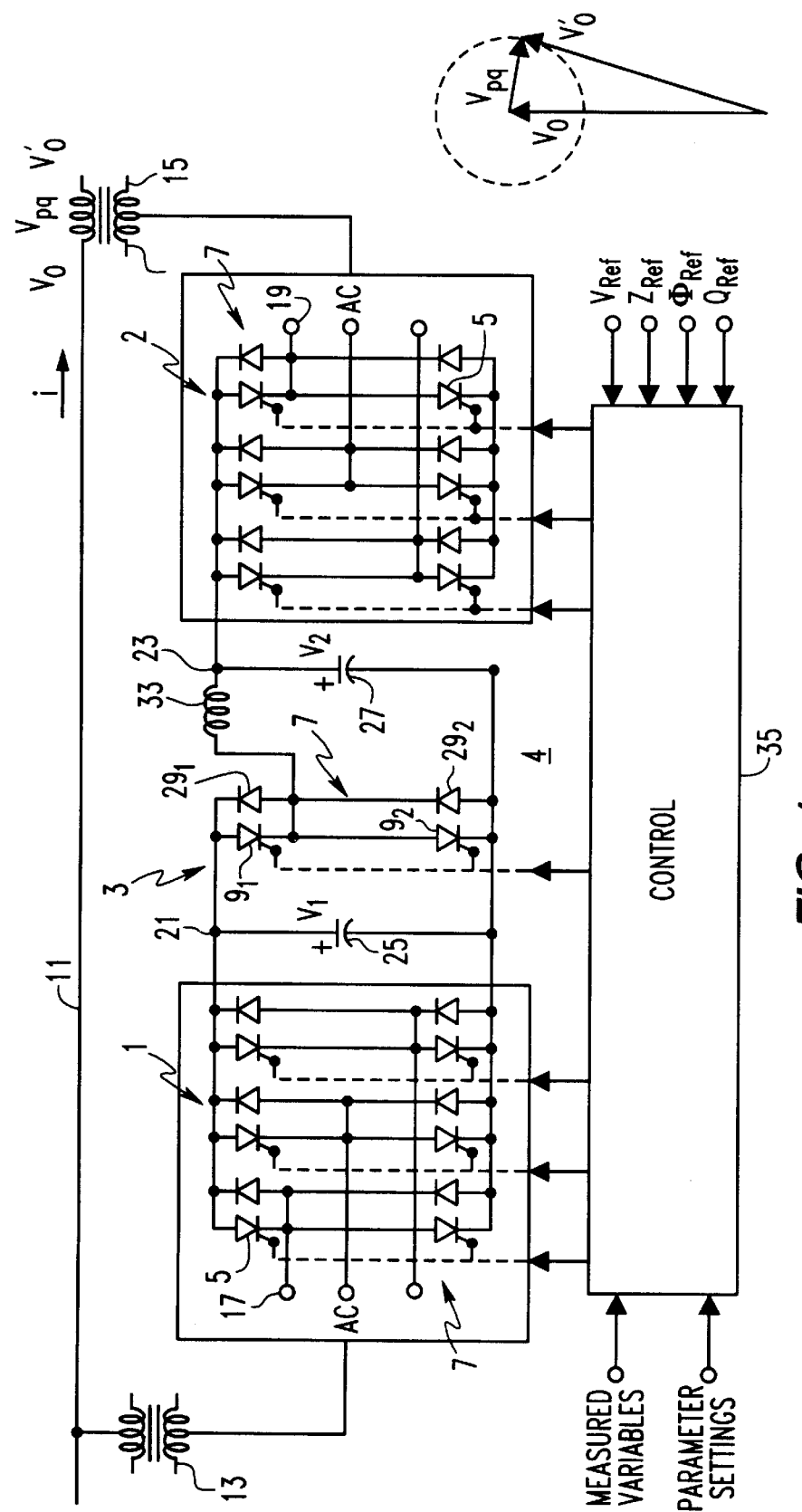

POWER FLOW CONTROLLER WITH DC-TO-DC CONVERTER LINKING SHUNT AND SERIES CONNECTED INVERTERS

BACKGROUND OF THE INVENTION

1. Field of the Invention

This invention relates to the control of power flow in electric power transmission lines using static inverters. More particularly, it relates to the use of a dc-to-dc converter to link, but yet allow the decoupling of, the shunt and series connected inverters in a generalized power flow controller.

2. Background Information

U.S. Pat. No. 5,343,139 describes a unique combination of solid-state power switching converters and controls that, when connected on an ac electric power transmission line, allows the rapid, concurrent or selective control of those electric parameters which determine the power transmitted in the line. That is, the described power converter and control arrangement, referred to as a generalized power flow controller, is able to vary concurrently or sequentially the transmission line impedance, the magnitude of the voltage applied to the transmission line, and the angle between the voltages appearing at the ends of the line.

The preferred power circuit of the generalized power flow controller described in U.S. Pat. No. 5,343,139 consists of two ac-to-dc switching inverter circuits in a back-to-back configuration with a common dc link capacitor. Inverter 2 in this arrangement is used to inject, by an insertion transformer, a voltage in series with the line, the angle of which is continuously variable between 0° and 360° with respect to the line voltage, and the magnitude of which is also continuously variable between zero and a predetermined maximum value. The sum of the injected voltage and the line voltage results in a new voltage that is applied to one end of the transmission line to control the power flow in it.

As the line current flows through the insertion transformer, the relationship between the injected voltage and the line current results in a power exchange between the ac system and Inverter 2. This exchanged power generally has two components, one is the real power component (obtained from the line current component that is in phase with the injected voltage) and the other is the reactive power component (obtained from the line current component that is in quadrature with the injected voltage). As known from the theory of ac-to-dc inverters, the inverter is able to generate the reactive power exchanged, but must be supplied at its dc terminals with the (positive or negative) real power exchanged at the ac terminals.

In the power circuit arrangement of U.S. Pat. No. 5,343,139, this real power is supplied by Inverter 1 from the ac system. That is, Inverter 1 is controlled so as to provide the real power demand of Inverter 2 at the common dc terminal and thereby establish a continuous real power flow through the two inverters as required to establish the desired overall power flow in the transmission line.

The two-inverter configuration with the common dc link capacitor implies that at least one of the inverters must be able to control the input to output voltage ratio. That is, either Inverter 2 must be able to convert from a fixed dc voltage to an ac voltage of variable magnitude, or Inverter 1 must be able to convert from an ac voltage of fixed magnitude to a dc voltage of variable magnitude. In the first case Inverter 2 directly controls the magnitude of the injected ac voltage. In the second case Inverter 1 does it indirectly by controlling the common dc link voltage. Since, as explained in U.S. Pat. No. 5,343,139, the generalized power flow controller may often be used also for shunt reactive compensation, which would require the dc link voltage to be of specific magnitude, in practice Inverter 2 would usually have to be able to control the magnitude of the injected ac voltage.

While there are techniques established in the dc-to-ac inverter art for continuous voltage magnitude control, they are usually associated with some or all of the following practical disadvantages: increased circuit complexity and cost, increased losses, and increased harmonic content. In addition to these disadvantages, the common dc link arrangement also results in an inherent inflexibility for the generalized power flow controller under ac system contingencies and possible inverter failures. This is a consequence of connecting the dc terminals of the two inverters rigidly together, which requires that both inverters must be fully operational to achieve any of the possible power flow functions in spite of the fact that some functions (e.g., series line impedance control and reactive shunt compensation) could be executed by a single series or shunt connected inverter.

There is a need then for an improved generalized power flow controller.

There is a particular need for an improved generalized power flow controller which provides more flexibility in operation, namely, which does not require both inverters to be operational in order to provide only series or parallel compensation.

There is also a need for such an improved generalize power flow controller with simplified controls.

More specifically, there is a need for such a controller which only requires the control system to control the phase angle of the voltage injected by the series connected inverter.

There is a related need for the voltage input of the series connected inverter to be controlled in order to control the magnitude of the compensation voltage injected into the transmission line.

There is an additional need for the above to be accomplished while obtaining real power, as needed, from the shunt connected inverter and at the same time allowing the dc voltage of the shunt inverter to vary to meet the need for parallel reactive compensation provided by the shunt inverter.

SUMMARY OF THE INVENTION

These needs and others are satisfied by the invention which is directed to a generalized power flow controller in which the dc terminals of the shunt and series connected inverters are coupled via a dc-to-dc converter. This arrangement allows the two inverters to operate from different dc voltage levels and therefore neither inverter needs to have an internal capability for voltage magnitude control. Also, the dc-to-dc converter is able to electronically disconnect the two inverters and thereby enable it to operate independently as a series and a shunt reactive compensator. The dc-to-dc inverter can also be used to limit the dc current flow between the two inverters, or vary one dc voltage with respect to the other in a particular way to counteract excessive ac power fluxuation at the dc bus under large ac system imbalances.

More particularly, the invention is directed to a power flow controller including a first inverter having ac terminals connected in shunt with the transmission line and operated to exchange reactive power with the transmission line, and a second inverter having ac terminals connected to inject an ac voltage into the transmission line in series. The power flow controller of the invention further includes dc-to-dc converter means connecting the dc terminals of the two inverters and control means controlling the dc-to-dc converter means to regulate the amplitude of the ac voltage injected by the second inverter into the transmission line. The control means further includes means regulating operation of the first inverter, and means regulating operation of the second inverter to control phase angle of the series injected ac voltage. Preferably, the dc-to-dc converter means comprises capacitors connected across the dc terminals of the first and second inverters and a dc chopper connected across both capacitors with control means controlling the dc chopper to exchange charge between the capacitors to regulate the voltage on the capacitor connected across the series connected inverter which establishes the magnitude of the series injected ac voltage.

The voltage across the dc terminals of the shunt connected inverter varies to meet the requirements for parallel reactive compensation. Typically, the range of this dc voltage is about ± fifteen percent of the transmission line voltage. On the other hand, the magnitude of the injected voltage for series compensation generated by the other inverter varies from zero up to about twenty-five percent or perhaps fifty percent of the transmission line voltage. In order to allow the dc voltage on the capacitor across the dc terminals of the series connected inverter to be reduced, even though it is lower in magnitude than the dc voltage on the capacitor across the dc terminals of the shunt connected inverter with which charge is exchanged, an inductor is provided in series with the capacitor across the series connected inverter. This inductor also limits the rate at which current is exchanged between the two capacitors.

BRIEF DESCRIPTION OF THE DRAWINGS

A full understanding of the invention can be gained from the following description of the preferred embodiments when read in conjunction with the accompanying drawings in which:

FIG. 1 is a schematic diagram of a unified power flow controller in accordance with the invention.

FIG. 2 is a phasor diagram illustrating the relationship of a voltage injected by the controller of FIG. 1 into a transmission line to the voltage in the transmission line.

DESCRIPTION OF THE PREFERRED EMBODIMENT

Figure 3:
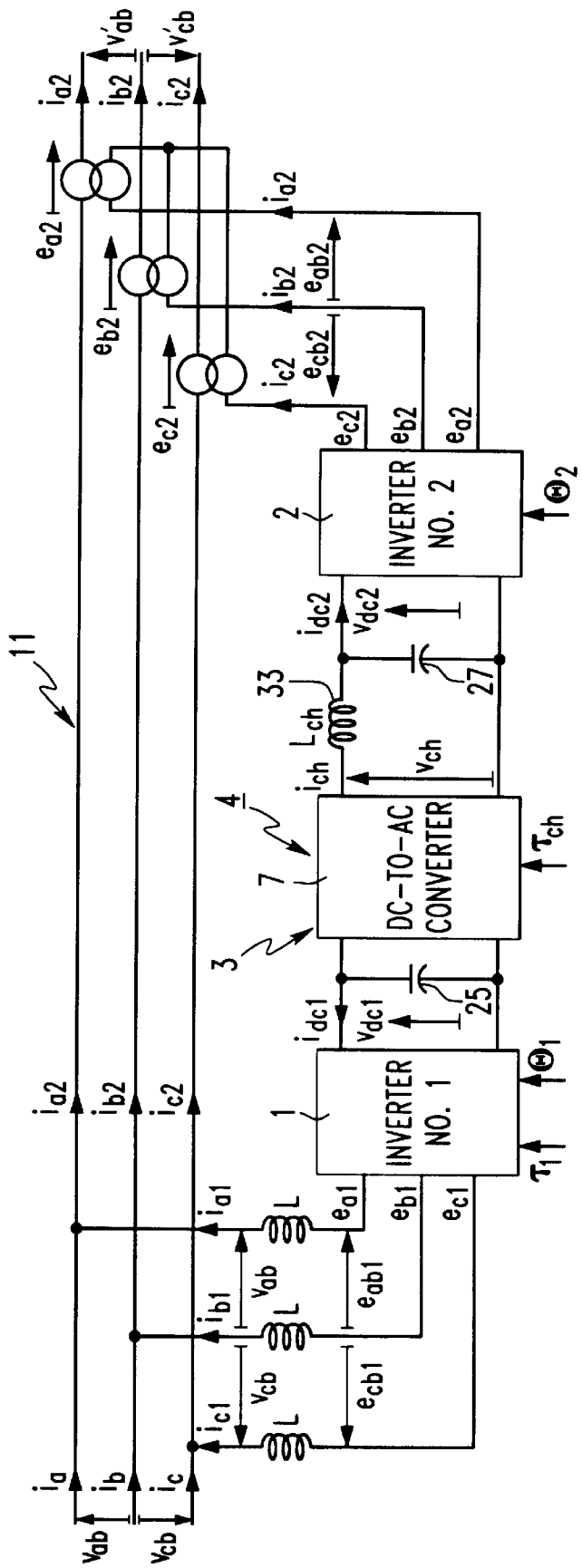
FIG. 3 illustrates a simplified functional representation of the power flow controller of FIG. 1.

As shown in FIG. 1, two power inverters 1 and 2 connected by a dc-to-dc converter system 3 form a generalized power flow controller referred to as the unified power flow controller (UPFC) 4 of the invention. The inverters 1 and 2 employ gate-turn-off (GTO) thyristors 5 or similar power semi-conductors. For clarity, the circuit implementation shown in FIG. 1 illustrates the use of simple six-pulse bridge inverter circuits 1 and 2, and a single dc-to-dc converter branch 7 having just two GTOs 9, however, it will be understood that in high power applications multi-pulse inverter circuits and multi-branch dc-to-dc converter circuits will typically be used. Examples of such extended circuit implications are shown in U.S. Pat. No. 5,343,139 which is hereby incorporated by reference.

The UPFC 4 is used to control the flow of power on a transmission line 11. Again, for clarity, the transmission line 11 is shown in simplified form as a single line, but represents a three-phase ac power transmission line. As in the generalized power flow controller of U.S. Pat. No. 5,343,139, the inverter 1 is connected to inject a voltage into the transmission line 11 in parallel with transmission line voltage through shunt connected transformer 13. The inverter 2 is connected to inject a voltage in series with the transmission line voltage through the series connected transformer 15. Each of the inverters 1 and 2 has ac terminals and dc terminals. The three-phase ac terminals 17 of inverter 1 are connected to the secondary of the parallel connected transformer 13 while the ac terminals 19 of the inverter 2 are connected to the secondary of the series transformer 15. The dc terminals 21 of inverter 1 and 23 of inverter 2 are connected through the dc-to-dc converter system 3.

The dc-to-dc converter system 3 includes a capacitor 25 connected across the dc terminals 21 of inverter 1 and a second capacitor 27 similarly connected across the dc terminals 23 of the inverter 2. In the preferred form of the invention, the dc-to-dc converter 7 of the dc-to-dc system 3 comprises a dc chopper. As shown in single branch form for clarity the dc chopper includes a first GTO $9_1$, with its anode connected to the positive dc terminal 21 of inverter 1 and a second GTO $9_2$ with its cathode connected to the negative dc terminal 21. Each of the GTOs $9_1$, and $9_2$ are shunted by anti-parallel diodes $29_1$, and $29_2$. The mid-point 31 between the GTOs $9_1$ and $9_2$ is connected through an inductor 33 to the positive dc terminal 23 of inverter 2 and to the positive side of the capacitor 27. A control circuit 35 generates the firing signals for the GTOs of the inverters 1 and 2 and of the dc chopper 7. As will be discussed, the control circuit 35 generates these firing signals from measured variables, parameter settings, and several reference inputs.

The inverter 1 is operated by the control circuit 35 to provide shunt reactive compensation to the transmission line 11, in a manner such as described in U.S. Pat. No. 5,343,139. In operating in this manner, the inverter 1 establishes the necessary dc voltage across the capacitor 25 by charging it from the transmission system 11 through the coupling transformer 13. Generally, this dc voltage varies about ± fifteen percent around the mid-value corresponding to the nominal magnitude of the voltage on the ac transmission line 11.

The dc chopper 7 converts the voltage $V_1$, maintained across the capacitor 25 by the inverter 1 to the dc voltage $V_2$ across the capacitor 27 terminating the dc input of inverter 2. The voltage $V_2$ is continuously variable between zero and a maximum value set by design. Generally, this maximum value will be about twenty-five percent to fifty percent of the nominal voltage on the transmission line. This voltage $V_2$ applied to the dc terminals 23 of the inverter 2 sets the magnitude of the ac voltage injected by inverter 2 into the transmission line 11 through series transformer 15. With this arrangement, the inverter 2 need only control its phase angle with respect to the ac line voltage. As discussed in U.S. Pat. No. 5,343,139, the phase angle of this injected voltage is controllable through 360°. With this flexible control of the magnitude in the phase angle of the series injected voltage, the inverter 2 can concurrently or separately control the transmission line voltage magnitude, transmission line impedance and transmission line voltage phase angle to control flow of power through the transmission line.

The dc-to-dc converter 7 is normally operated with a pulse-duration control. That is, GTO $9_1$, is switched on to transfer energy from capacitor 25 across the inverter 1 to capacitor 27 across the dc input to the inverter 2 to thereby increase the voltage $V_2$. In this mode, the inductor 33 serves to limit the rate of current flow through the dc-to-dc converter 7. As discussed above, the voltage $V_2$ on the capacitor 27 is typically below the voltage $V_1$ on capacitor 25. In order to reduce the voltage $V_2$ on the capacitor 27, the GTO $9_2$ is turned on. This charges the inductor 33. When the GTO $9_2$ is turned off, the interruption of the flow of current results in a build up in voltage across the inductor 33 which forward biases the anti-parallel diode $29_1$ so that charge flows from the capacitor 27 to the capacitor 25 to reduce the voltage $V_2$. By appropriately operating the GTOs $9_1$, and $9_2$, the required voltage $V_2$ can be established and maintained even when the voltage $V_1$ varies as a result of changes in the required shunt reactive compensation provided by inverter 1.

If both GTO $9_1$ and GTO $9_2$ are turned off, the dc terminals 21 and 23 of the inverters 1 and 2, respectively, become electronically disconnected, and power flow between the two inverters ceases. In this case, each inverter can be operated separately. This may be an operating requirement if the transmission line under some conditions requires only reactive series and/or shunt compensation. Also, this operating mode could be a pre-contingency operation of a strong network in order to keep the operating losses of the generalized power flow controller at a minimum. It should be noted that the inverter 1 supplies the real power requirements of the inverter 2. With the two inverters de-coupled by the dc-to-dc converter 7, the inverter 2 can only provide reactive series compensation unless another source of real power is provided.

The phase relationship of the voltage $V_{pq}$ injected in series into the transmission line 11 by the inverter 2 is illustrated by the phasor diagram of FIG. 2 and results in a difference in the voltage at one end of the line $V_0$ and the voltage $V_0{}'$ at the other end of the transmission line. As mentioned, the phase relationship between this injected voltage $V_{pq}$ and the ac system voltage is fully controllable.

FIG. 3 illustrates a simplified schematic diagram of the power flow controller 4 of the invention including name and polarity conventions for variables used by the control circuit 35. This figure also defines the basic functions and control inputs to inverter 1, inverter 2, and the dc chopper 7. For the purpose of illustration, inverter 1 is represented in a generalized way as an inverter with the capability for control of both the phase angle $\Theta_1$ of its ac output $V_{dc1}$ voltage, and the magnitude $\tau_1$ of the ac voltage relative to the dc terminal voltage. Thus, inverter 1 has two control inputs, $\Theta_1$, and $\tau_1$, for control of angle and magnitude, respectively. Inverter 2 is shown in FIG. 3 to be capable only of phase angle control, with a single associated control input, $\Theta_2$. The magnitude of its ac output voltage is directly related to its dc terminal voltage $v_{dc2}$. The dc chopper 7 has a single control input, $\tau^{ch}$, that controls the ratio between the high voltage input, $v_{dc1}$, and the average output voltage, $v_{ch}$. The input $\tau_{ch}$ is essentially the duty cycle of the chopper and can be varied between zero and one.

The ac output voltages of the inverter 1 are defined as follows:

$$\begin{bmatrix} e_{a1} \\ e_{b1} \\ e_{c1} \end{bmatrix} = \begin{bmatrix} \tau_1 v_{dc1}\cos(\theta_1) \\ \tau_1 v_{dc1}\cos\left(\theta_1 - \frac{2\pi}{3}\right) \\ \tau_1 v_{dc1}\cos\left(\theta_1 + \frac{2\pi}{3}\right) \end{bmatrix} \quad \text{Eq. (1)}$$

The voltage injected by inverter 2 is defined as follows:

$$\begin{bmatrix} e_{a2} \\ e_{b2} \\ e_{c2} \end{bmatrix} = \begin{bmatrix} k.v_{dc2}\cos(\theta_2) \\ k.v_{dc2}\cos\left(\theta_2 - \frac{2\pi}{3}\right) \\ k.v_{dc2}\cos\left(\theta_2 + \frac{2\pi}{3}\right) \end{bmatrix} \quad \text{Eq. (2)}$$

Where k is a constant.

The average output voltage $v_{ch}$ of the dc chopper 9 is defined as follows:

$$\tau_{ch} = \tau_{ch} v_{dc1} \quad \text{Eq. (3)}$$

Where $\tau_{ch}$ is the <1.

Figure 4:
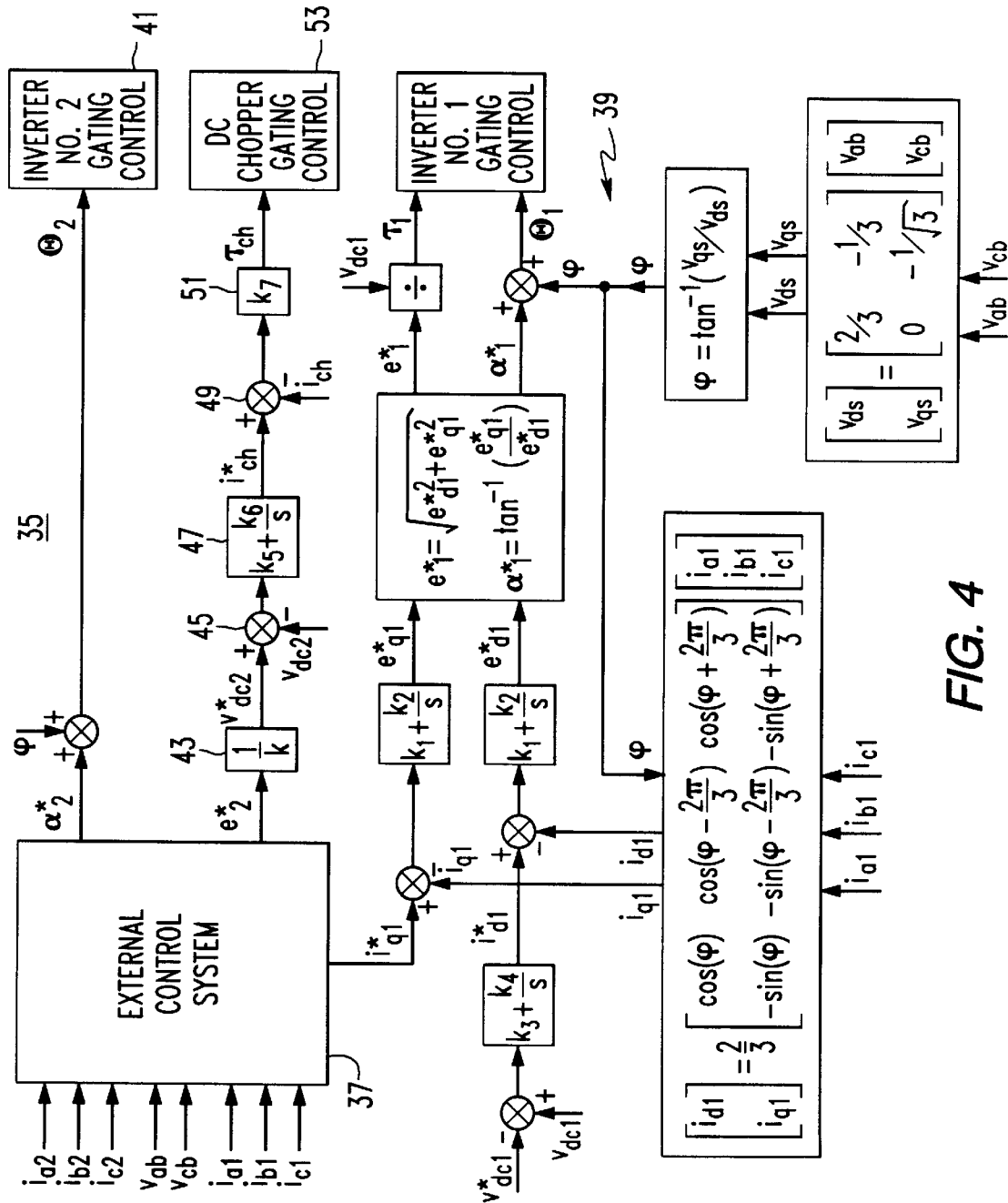
FIG. 4 is a schematic diagram in block form of a control system which forms part of the power flow controller of FIG. 1.
Figure 3:
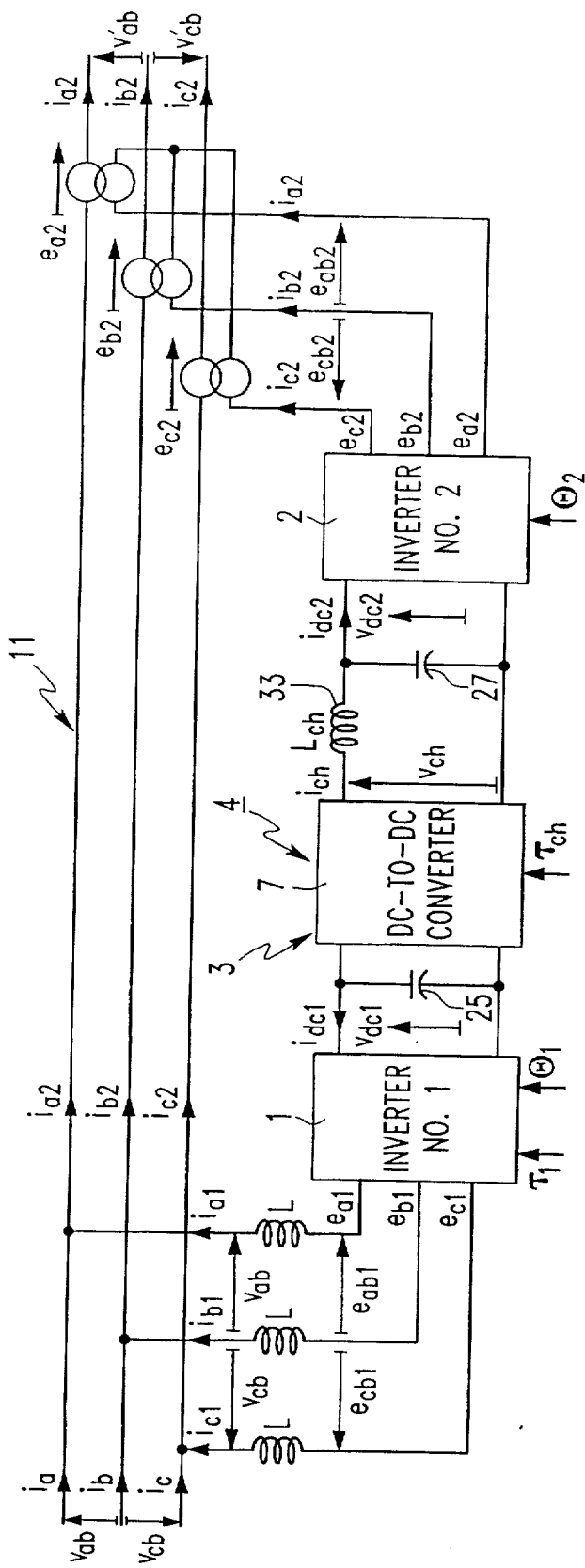

FIG. 4 illustrates the control circuit 35 in block diagram form. Input to the control circuit 35 comes from an external control system 37 which provides the following continuous demand signals:

$i_{q1}{}^*$, the ac reactive current demand for inverter 1

$\alpha_2{}^*$, the phase angle demand for inverter 2 output ac voltage $e_2{}^*$, the magnitude demand for inverter 2 output ac voltage.

The control circuit 35 determines the instantaneous values of $\tau_1$, $\Theta_1$, $\tau_{ch}$, and $\Theta_2$ in such a way as to rapidly and continuously satisfy these demands, while also regulating the dc terminal voltage of inverter 1, $v_{dc1}$, to a constant reference value, $v_{dc1}{}^*$. In general, the external control system 37 acts to provide optimum utilization of the transmission line 11 by, for example, controlling power flow or damping power oscillations. As can be seen from FIG. 4, the inputs to this external control are the phase currents of the inverter 1 and the compensated currents in the transmission line as well as the transmission line phase-to-phase voltages. As is also evident from FIG. 4, a large part of the control circuitry 35 is devoted to determining $\tau_1$ and $\Theta_1$ for inverter 1 in such a way as to satisfy the demands, $i^*_{q1}$ and $v^*_{dc1}$. This part 39 of the control circuit 35 is a vector control scheme similar to that described for performing the same function as in U.S. Pat. No. 5,343,139.

The novel feature of the proposed control scheme is control of inverter 2 output voltage. The angle request $\alpha^*_2$, expressed relative to the transmission line voltage, is added to the phase angle, ø, of the line voltage and is passed directly to inverter 2 gating control 41 of inverter 2 as the control input, $\Theta_2$. The output voltage magnitude requested for inverter 2, $e^*_2$, divided by the proportionality constant, k, at 43 is interpreted as a demand for inverter 2 dc terminal voltage, $v^*_{dc2}$. This demand is compared at 45 with the feedback voltage, $v_{dc2}$, and the error signal is passed through a proportional plus integral compensation block 47. The output of the block 47 is interpreted as a demand for dc chopper output current, $i^*_{ch}$. This demand is compared with the feedback current, $i_{ch}$, at 49, and the error signal is passed through a proportional gain compensating block 51. The output of the block 51 is passed to the dc chopper gating control 53 as the control input, $\tau_{ch}$. The control loop structure for $v_{dc2}$ is thus seen to comprise an inner current control loop for $i_{ch}$ with an outer voltage control loop for $v_{dc2}$.

While specific embodiments of the invention have been described in detail, it will be appreciated by those skilled in the art that various modifications and alternatives to those details could be developed in light of the overall teachings of the disclosure. Accordingly, the particular arrangement disclosed are meant to be illustrative only and not limiting as to the scope of invention which is to be given the full breath of the claims appended and any and all equivalents thereof.

What is claimed is:

1. A power flow controller for an ac transmission line, said controller comprising:
   a first inverter having ac terminals connected in shunt with the transmission line and having dc terminals;
   a second inverter having ac terminals connected to inject an alternating voltage in series with said transmission line and having dc terminals;
   dc-to-dc converter means connecting said dc terminals of said first inverter to said dc terminals of said second inverter; and
   control means for controlling operation of said first inverter, operation of said second inverter to control phase angle of said alternating voltage injected into said transmission line relative to phase of voltage on said transmission line, and controlling said dc-to-dc converter to regulate amplitude of said alternating voltage injected by said second inverter into said transmission line.

2. The power flow controller of claim 1 wherein said dc-to-dc converter means comprises a first capacitor connected across said dc terminals of said first inverter, a second capacitor connected across said dc terminals of said second inverter, and a dc chopper connected between said dc terminals of said first and second inverters, said control means comprising means operating said dc chopper to exchange charge between said first and second capacitors to regulate voltage on said second capacitor and therefore across said dc terminals of said second inverter.

3. The power flow controller of claim 2 wherein said dc chopper includes first electronic switch means and second electronic switch means connected in series with a common polarity across said first capacitor, and said second capacitor is connected across one of said first and second electronic switch means.

4. The power flow controller of claim 3 wherein said first and second electronic switch means each comprise at least one electronic switch and at least one anti-parallel diode connected across said at least one electronic switch.

5. The power flow controller of claim 4 wherein said dc-to-dc converter means includes an impedance connected in series with said second capacitor across said one of said first switch means and said second switch means.

6. The power flow controller of claim 5 wherein said impedance comprises an inductor.

\* \* \* \* \*

UNITED STATES PATENT AND TRADEMARK OFFICE
CERTIFICATE OF CORRECTION

PATENT NO. : 5,808,452

DATED : September 15, 1998

INVENTOR(S) : LASZLO GYUGYI et al.

It is certified that error appears in the above-identified patent and that said Letters Patent is hereby corrected as shown below:

The drawing sheet consisting of Fig. 3, should be deleted and replaced with the drawing sheet as shown on the attached page.

Signed and Sealed this

Thirtieth Day of November, 1999

Attest:

Q. TODD DICKINSON

Attesting Officer

Acting Commissioner of Patents and Trademarks